United States Patent [19]
Mak et al.

[11] Patent Number: 5,627,858
[45] Date of Patent: May 6, 1997

[54] MULTI-CHANNEL AUTOBAUDING CIRCUIT

[75] Inventors: Simon C. Mak, Pomona; William C. Wong, Garden Grove, both of Calif.

[73] Assignee: Telefonaktiebolaget L M Ericsson, Stockholm, Sweden

[21] Appl. No.: 480,546

[22] Filed: Jun. 7, 1995

Related U.S. Application Data

[63] Continuation of Ser. No. 915,241, Jul. 20, 1992, abandoned.

[51] Int. Cl.$^6$ ............................................. H04B 3/46
[52] U.S. Cl. .................. 375/225; 375/220; 375/377; 370/252
[58] Field of Search ................................ 375/213, 219, 375/220, 221, 224, 225, 228, 260, 349, 354, 357, 358, 369, 370, 377; 370/13, 15, 17, 30, 84, 112

[56] References Cited

U.S. PATENT DOCUMENTS

| | | | |
|---|---|---|---|
| 3,747,074 | 7/1973 | Schulze | 375/78 |
| 4,310,922 | 1/1982 | Lichtenberger et al. | 370/48 |
| 4,433,424 | 2/1984 | Taber et al. | 375/106 |
| 4,622,685 | 11/1986 | Dhawan et al. | 375/121 |
| 4,637,035 | 1/1987 | Betts | 375/8 |
| 4,663,766 | 5/1987 | Bremer | 375/121 |
| 4,755,988 | 7/1988 | Nelson et al. | 370/84 |
| 4,761,800 | 8/1988 | Lese et al. | 375/121 |
| 4,862,456 | 8/1989 | Giorgio | 370/118 |
| 4,864,567 | 9/1989 | Giorgio | 370/118 |
| 4,893,305 | 1/1990 | Fernandez et al. | 370/84 |
| 4,905,258 | 2/1990 | Shimatani et al. | 375/117 |
| 4,933,934 | 6/1990 | Aikah et al. | 370/112 |
| 5,008,902 | 4/1991 | Key et al. | 375/10 |
| 5,012,489 | 4/1991 | Burton et al. | 375/8 |
| 5,049,875 | 9/1991 | DeLuca et al. | 340/825.44 |
| 5,050,167 | 9/1991 | Izadpanah | 370/112 |
| 5,072,407 | 12/1991 | Gutz et al. | 364/514 |
| 5,107,518 | 4/1992 | Petty, Jr. | 375/121 |
| 5,157,651 | 10/1992 | Ghelberg et al. | 370/13 |
| 5,163,072 | 11/1992 | Lill | 375/117 |
| 5,222,081 | 6/1993 | Lewis et al. | 375/117 |
| 5,251,210 | 10/1993 | Mann et al. | 370/112 |
| 5,274,679 | 12/1993 | Abe et al. | 375/117 |
| 5,278,836 | 1/1994 | Iimura et al. | 370/112 |
| 5,323,399 | 6/1994 | Kurano | 370/112 |

Primary Examiner—Stephen Chin
Assistant Examiner—Amanda T. Le
Attorney, Agent, or Firm—Jenkens & Gilchrist, P.C.

[57] ABSTRACT

A system and method for data transfer. The system determines the baud rate of a plurality channels carrying of asynchronous data streams by measuring a time period T between the beginning of a start bit and the transition to a logic high at the beginning of each odd-ASCII character. The system assesses baud rates over a continuous variable range. The system loops back data to its source to provide an echo while determining the baud rate.

16 Claims, 4 Drawing Sheets

MULTI-CHANNEL AUTOBAUDING CIRCUIT

This application is a continuation of application Ser. No. 07/915,241, filed on Jul. 20, 1992, which was abandoned upon the filing hereof.

BACKGROUND OF THE INVENTION

1. Field of the Invention

The present invention relates to data transfer and, more particularly, to automatic detection and management of baud rate within a data communications system.

2. Description of Related Art

In the communication of digital data from one digital device to another, it has long been common to employ terminal adapter units (TAU) as an interface between the digital device and the transmission network. For example, different digital devices often send and receive data in accordance with different protocols and a TAU is necessary to translate the data for the receiving/sending digital device. The data rate at which different digital devices and transmission circuits can operate for communicating between devices may vary greatly and range from a baud rate of a few hundred bps up to several thousand bps. Baud is a communication term corresponding to the number of bits per second (bps) at which data is sent along a communications medium. In order to receive data on behalf of digital devices, a terminal adapter unit must be capable of recognizing the rate at which data is being sent in order to properly receive the transmitted information. That is, it is necessary to coordinate the operation of two devices which are sending and receiving data to one another in order to ensure that the information is correctly interpreted. A terminal adapter unit cannot accurately receive data without knowing the rate at which that data is coming in.

Various circuits have been proposed to provide automatic baud rate detection in communications products such as modems, printers and plotters in order to facilitate the proper synchronization of transmission rates and enable the sending of data via communication links. Such circuits include U.S. Pat. No. 3,626,306 to Puckett and U.S. Pat. No. 3,696,338 to Priess which disclose techniques for synchronizing data transmissions employing the recognition of zero slope points on the received analog wave form and varying the transmission rate based upon the presence or absence of information. Such early techniques had inherent accuracy problems.

Other prior art methods of automatically determining the baud rate of a serial bit stream includes measurement of the duration of a start bit. Such techniques depend upon a user device sending a specified character (an autobaud character) as the first character of the session and measuring the duration of the start bit to determine the baud rate of the transmitted information. However, because of the inaccuracies inherent in timing of bits in a serial bit stream, the width of the start bit may vary substantially. Reliance on this calculation alone combined with the possibility of an erroneous character bit being sent instead of the correct autobaud character causes incorrect baud rates to be selected by the terminal adapter unit resulting in inaccuracy in the reception of subsequently transmitted data. Most of these systems also included the ability to receive only a single channel of data resulting in inordinate expenses in multichannel data communications.

Another technique, such as that shown in U.S. Pat. No. 5,008,902 to Key et al., includes the accumulation of a plurality of samples of data and then comparing the received bits to an autobaud character. If a match occurs, the sampling clock is assumed to be correctly synchronized with the incoming data stream. If no match occurs then the data clock is subdivided and another sample taken for a subsequent comparison. Such a technique is only capable of handling a single channel of data and is also unduly slow in that no data can be received until a correct decision as to the baud rate has been determined.

A need exists for a system which can determine baud rate on multiple channels while also passing data through the system and then serving as a data receiver once baud rate has been determined.

SUMMARY OF THE INVENTION

In one aspect, the system of the present invention includes the rapid detection of a preliminary data rate in an incoming bit stream followed by a verification of that rate by the recognition of a selectively stored trapped character which would only be recognized if the preliminary data rate was correct.

In another aspect, the system of the present invention includes an autobauding circuit for a terminal adapter unit which is capable of receiving multiple channels of data simultaneously and then selecting and verifying a preliminary data rate for each separate channel.

In still another aspect, the system of the present invention overcomes the disadvantages of the prior art techniques by first making preliminary baud rate calculations for each of a plurality of channels and then confirming the accuracy of that preliminary baud rate determination by the ability of the circuit to recognize the reception of a selected character on each channel. Data is continuously received on each of the channels and once the selected character is recognized the data is taken to be correct and the baud rate determination accurate. The circuit may then perform as a data transmitter/receiver for the remainder of that data exchange.

BRIEF DESCRIPTION OF THE DRAWINGS

For a more complete understanding of the present invention and for further objects and the advantages thereof, reference can now be had to the following description, taken in conjunction with the accompanying drawings in which.

DETAIL DESCRIPTION

Figure 1:
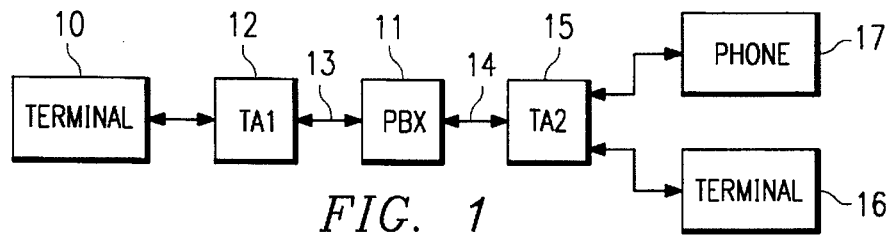
FIG. 1 is a block diagram showing an illustrative data communications circuit employing terminal adapter units.

Referring first to FIG. 1, there is shown a block diagram illustrating a representative data communication link in which a digital data terminal 10 is linked to a private branch exchange switch (PBX) 11 for data communication by means of a first terminal adapter unit 12. The link 13 between the terminal adapter unit 12 and the PBX 11 includes a circuit capable of transmitting data from one to the other. The PBX 11 is connected to a second data transmission circuit 14 leading to a second terminal adapter unit 15 which, in turn, is connected to a data terminal 16 and a voice telephone 17. The terminal adapter units 12 and 15 include serial communication controllers ( SCC ) such as universal asynchronous receiver/transmitters (UART) which are capable of receiving digital data at various data rates and formatted in accordance with different data protocols. The terminal adaptor units then adapt the received data in accordance with the requirements of the digital terminals 10 and 16 which may comprise a personal computer, a data terminal, a mainframe or a mini-computer each having a plurality of data ports, or numerous other digital devices. The terminal adapter units 12 and 15 are capable of converting data from one format to another and from one protocol to another and receiving data at varying rates to enable the terminals 10 and 16 to communicate with one another even though they may be transmitting data at substantially different rates from one another. If a terminal adapter unit is receiving data faster than the terminal for which it is receiving can accept that data, buffer memory may also be included which allows data to be received and buffered and sent to the terminal at the rate it can accept. In addition, the terminal adapter units are also capable of detecting whether the respective data rates of the transmitting and receiving terminals are so different from one another that they are incapable of communicating and thus so advising a sending unit without establishing an actual data transfer connection therebetween.

A terminal adapter unit, such as 12 and 15, must be capable of measuring the baud rate of the data being received by it in order to be able to process that data and adapt it for input to the digital terminal device to which it is connected. Thus, each terminal adapter unit must include a means for measuring the data rate of incoming data to verify that its associated device can receive that data at the rate it is being sent prior to connecting the data into the device. The system of the present invention allows the automatic measurement and verification of data rate prior to the passage of data to a terminal device and does so for a plurality of incoming data channels simultaneously. In one embodiment, the present system can detect the baud rate of an incoming asynchronous data stream ranging from 300 Baud to 64 KBaud for four channels simultaneously. In addition to providing baud rate information, the system of the present invention includes in each of its plural channels or ports a serial receiver which contains a multibyte FIFO circuit for storing incoming asynchronous characters and character trapping capability on each channel.

Figure 2:
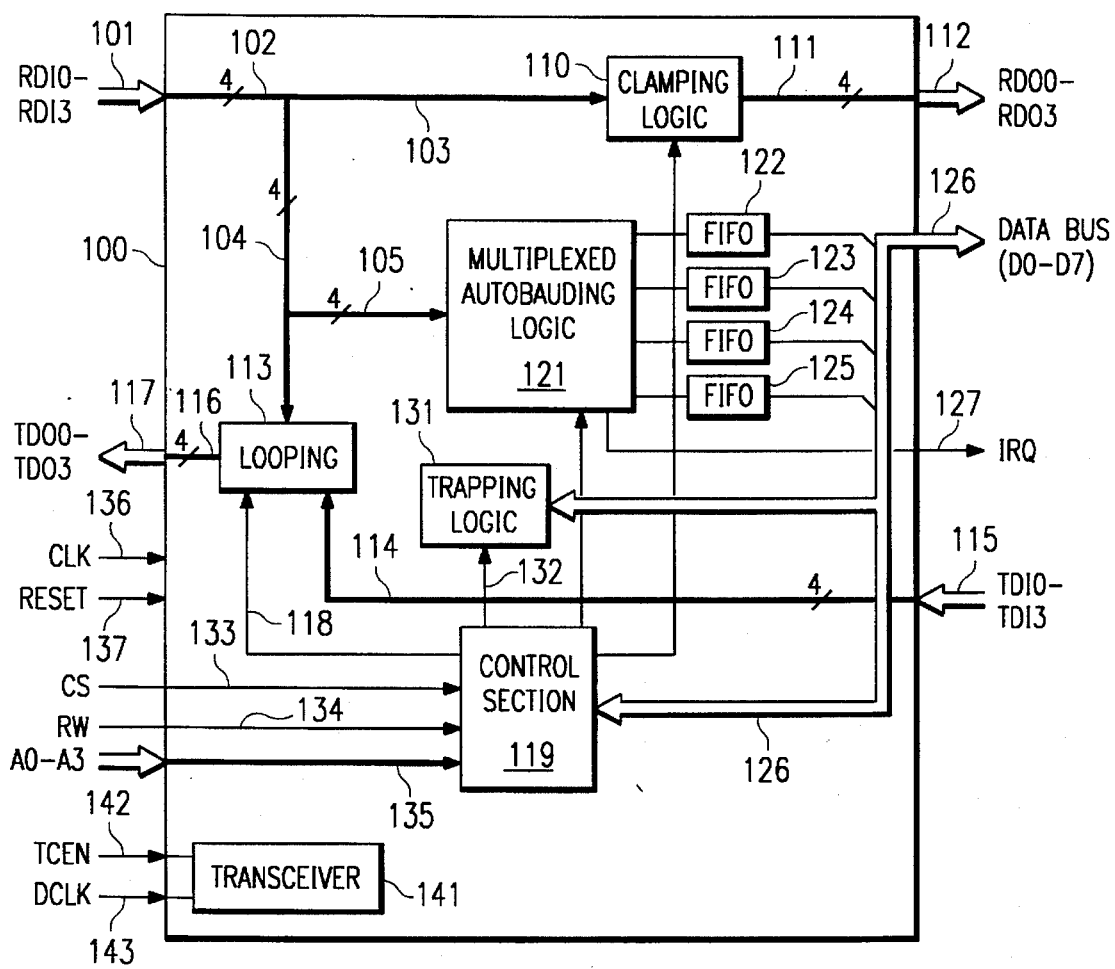
FIG. 2 is a block diagram of a multi-channel autobauding circuit constructed in accordance with the teachings of the present invention.

Referring next to FIG. 2, there is shown a block diagram of a circuit constructed in accordance with the teachings of the present invention. The circuit includes baud rate detection and data reception on each of four channels by multiplexing the use of single autobaud detection and serial data reception circuits. In FIG. 2, four received data input channels (RDI0-RDI3) are received at an input port 101 and connected to a four channel bus 102. Each of the four channels are connected in parallel by branches 103, 104, and 105. The bus branch 103 is connected to the four inputs of a clamping logic circuit 110, the output of which is connected via a four channel bus 111 to an output port 112 forming four parallel received data output channels (RDO0-RDO3). The second bus branch 104 is connected to four inputs of a looping circuit 113 along with a second input comprising a four channel bus 114 connected from four transmit data input channels (TDI0-TDI3). The output from the looping circuit 113 is connected to a four channel bus 116 as four transmit data output channels (TDO0-TDO3). The looping circuit 113 is controlled by signals on a control line 118 from a control section 119. The third branch 105 of the input bus 102 is connected to a multiplex autobauding logic circuit 121 which performs the autobauding sampling and calculations as will be further discussed below. The output of the autobauding logic circuit 121 is connected through four parallel first-in first-out (FIFO) circuits 122–125, the outputs of which are connected to a databus 126 leading to a control microprocessor (not shown). The databus 126 carries signals D0–D7 and is also connected to the input of the control section 119. The autobauding logic circuit 121 has an interrupt lead 127 (IRQ) connected as an interrupt signal to the microprocessor (not shown).

The data bus 126 is also connected to a trapping logic circuit 131 which includes an input 132 from the control section 119. The control section 119 receives input in the form of a chip select signal over line 133, a read/write signal over line 134 and a four bit address via bus 135. The autobaud/receiver circuit 100 receives from the microprocessor a clock signal 136 along with a reset signal 137. Finally, a transceiver circuit 141 receives a transceiver enable signal (TCEN) via lead 142 and a data clock signal (DCLK) via a lead 143.

In general, four separate parallel asynchronous data streams are received at input port 101 from connection to four serial data communications controllers such as UARTs. The received data is inhibited from reaching the output port 112 by means of the clamping logic 110 which prevents garbled data from being passed through the system until the circuit has determined the baud rate and adapted the data terminal for receiving data at the rate it is being sent. During this period, the circuit may well loop the four input channels at the input port 101 back to the output port 117 via the looping circuit 113 so that the sending data device receives an echo back of the transmitted signals until data transfer actually begins.

The incoming data signals RDI0–RDI3 on input port 101 are connected to the multiplex autobauding logic circuit 121 which sequentially samples each of the data channels in accordance with the techniques of the present invention to determine first a preliminary data rate which is then used to sample the incoming bits and attempt to recognize the reception of a character which had been stored in the trapping logic 131. Upon recognition of the trapped character, the circuit determines that the preliminary data rate on that channel was correct, otherwise the sample character could not have been recognized, and the circuit then behaves as a data receiver for the reception of data from an associated serial communications controller in a conventional fashion. If, however, the character read out from the FIFO is not the same as the trapped character within a preselected period of time, the microprocessor can then determine whether or not it wishes to take another sample and again attempt to determine a preliminary data rate which will be used to sample additional incoming bits and again attempt to determine the presence of a trapped character.

Figure 3:
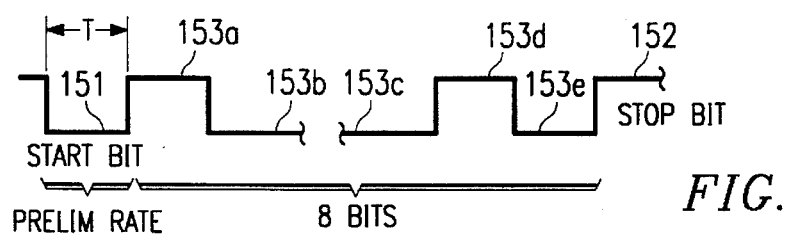
FIG. 3 is a block diagram illustrating certain timing aspects of the system of the present invention.

Referring now to FIG. 3, it can been seen how the system of the present invention initially samples incoming data to determine a preliminary and final data rate. The system requires the first input character in this determination to be an odd value in the ASCII character set so that the first bit after the start bit will include a transition from low to high. As shown in FIG. 3, a start bit 151 is always low so that the time period T between the beginning of the start bit and the transition to a high at the beginning of each odd ASCII character can be measured. This period T is used to calculate a preliminary data rate for the data following the start bit 151. Once this data rate is calculated, it enables the system to sample each of the 8 bits before the stop bit 152 at approximately the mid period thereof, represented at points 153a–153e. Sampling near the mid point of a bit gives a substantially more accurate assessment of the value of the bit than somewhere near the edges due to the characteristic delay time and other inherent circuit inaccuracies. As the values of the bits following the start bit are ascertained, from sampling near the mid points of each of the bits, they are moved into a FIFO circuit to form a character which is then applied to the trapping logic 131 within which is stored a selected character to be recognized by the system. For example, a character such as an escape sequence, or other odd ASCII character, can be selected as the desired trapped character to be recognized by the circuit. If, a trapped character is recognized by the circuit as having been received, based upon the sampling at the mid point of the bits of that character, the system determines that the preliminary data rate initially assessed from the pulse width of the start bit was correct, and hence the baud rate determined from that sample is accurate. This enables the circuit of the invention to assess baud rates over a relatively continuously variable range rather than being confined to a few selected discreet baud rates as is presently the accepted practice. Recognition of a trapped character also confirms that the circuit is receiving data at the correct baud rate and hence the system may be configured as a data receiver and the clamping circuit disabled so the received data passes directly to the output port 112 and the receiving device.

Figure 4:
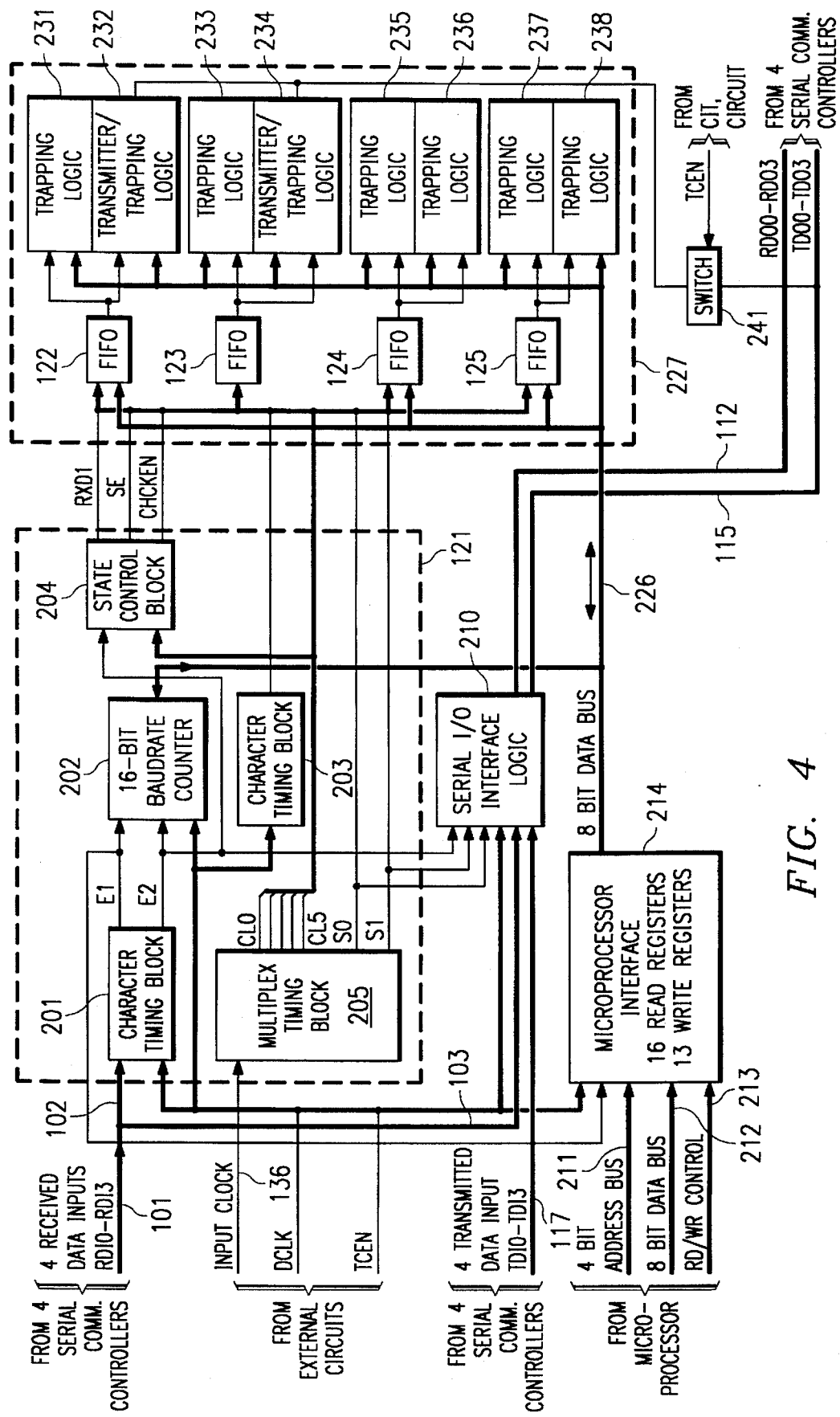
FIG. 4 is a more detailed block diagram of a multichannel autobauding circuit constructed in accordance with the teachings of the present invention.

Referring next to the more detailed block diagram of one embodiment of the circuit of the present invention shown in FIG. 4, incoming data from four data lines 101 from four serial communication controllers is connected to both a multiplex autobaud detection block 121 and serial I/O interface logic 210. Within the multiplex autobaud detection block 121, the data is connected to a character timing block 201. Output E1 from the character timing block 201 is connected to a 16 bit baud rate counter 202 and a microprocessor interface 214. Output E2 from the character timing block 201 is connected to the 16 bit baud rate counter 202, a state control block 204 and a serial I/O interface logic 210. The microprocessor interface circuit 214 is connected to the character timing block 201, the baud rate counter 202, the character timing block 203 and the serial I/O interface logic 210. The microprocessor interface 214 contains 16 8-bit read registers and 13 8-bit write registers the selective configuration of some of which control the operation of the system as will be further set forth below. A multiplex timing block 205 receives an input master clock signal, and divides that clock signal down into various subdivisions for various timing purposes.

The external control microprocessor (not shown) is connected to the interface circuit 214 by means of an address bus 211 and a data bus 212 as well as a read/write control signal lead 213. The output of the interface block 214 comprising a bi-directional 8-bit databus 226 is connected to both a transmitter/receiver and trapping block 227 as well as the 16 bit baud rate counter 202 within the multiplex autobaud detection block 121. The transmitter/receiver and trapping block 227 comprises a plurality of FIFO circuits 121–125, the outputs of each of which are connected to a pair of trapping logic circuits 231–238. Each of these logic circuits receive a trapping character from one of 8 trapping registers (included among the 13 write registers of the microprocessor interface 214) and store that character for comparison with the contents of the character within the FIFO associated therewith. In this way, the circuit is capable of detecting either one of two trapping characters for each of the four channels to determine validity of the autobauding rate and as a data receiver. The multiplex timing block 205 supplies timing signals CL0–CL5 and S0 and S1 to the FIFO circuits to insure proper stepping of received bits into the circuits. The RXD1 output of the state control block 204 comprises the received character bits themselves being stepped through the multiplex autobaud detection block 121 and into the FIFO circuits. The SE signal output from the state control block 201 is a shift enable signal while the CHCKEN signal is a character clock enable signal both of which are used in shifting bit forming characters into the FIFO circuits.

Two of the trapping logic circuits 232 and 234 also are capable of operating as data transmitters. In this case, they are connected through a switch 241 which is enabled by the presence of a signal on the TCEN (transceiver enable) lead coming from an external circuit to selectively enable the functioning of that trapping register as a transmitter rather than as a trapping register.

The inputs DCLK and TCEN coming from an external circuit into the multiplex timing block or into the character timing block 201 enables the use of two channels of the circuit as transmitter/receiver using external clock (DCLK) to provide data bit synchronization but a data format which is still asynchronous for use in certain types of receiver circuitry.

The serial I/O interface logic 210 is connected between the transmit and receive inputs and outputs of each of the four serial data communications controllers with the circuit interfaces. The interface logic 210 enables clamping of incoming data to prevent transparent passage until baud rate has been determined on each channel. It also enable looping of incoming data until the baud rate is determined and the circuit is configured into a data receiver/transmitter to allow transparent data passage.

In operation, data is received on the data input bus 101 and sent into the character timing block 201 which triggers the 16 bit baud rate counter to begin running at a selected timing clock frequency. The character timing block begins its signal at the leading edge of a start bit of an odd character. At the end of that start bit, signaled by the first bit at the beginning of the odd character, the voltage transition causes the character timing block to disable the counter and the count left therein is taken as an indication of the baud rate. Thereafter, the system begins sampling the remainder of the incoming data pulses at approximately the mid-point of each pulse and then moves those pulses into the FIFO's of each of the four channels in a synchronized fashion. When a FIFO (which can contain four bytes) has received a full character, that character is compared with the character stored in both of the trapped character logic circuits to determine if a trapped character exists in the FIFO. If a character is recognized within the FIFO but it is not the selected trapped character, then the system determines whether or not there is a framing error present.

In summary, the various registers and timings within the circuit enable an orderly multiplex handling of four channels simultaneously to determine the baud rate and thence either unclamp the incoming data and send it directly to a UART or to use the data itself.

As can be seen, the system of the present invention samples four incoming data channels sequentially and makes a preliminary data baud rate calculation for each of those channels independently of one another. In doing so the circuits of FIGS. 2 and 4 accept incoming asynchronous serial data from its four receive data input channels at the input port 101, and requires the first input character to be an odd value so that a baud rate interrupt is generated after the start bit of the first character received. There is no idle time needed between characters and the circuit can receive back to back characters. As pointed out above, the circuit is designed as a supplemental component to a serial communication controller (SCC) such as a UART, which must operate with a known speed and data format. Hence, the present system provides flexible and convenient SCC interface such as clamped or transparent receive/transmit data toward a UART with character trapping and digital loop back interfaces.

The circuits of FIGS. 2 and 4 are fully controllable and programmable with read and write registers being accessible by the microprocessor through a bi-directional eight bit data bus (D0–D7) 126 and 226 as well as the four bit address bus (A0–A3) 135 and 211. The four channels in the circuit are functionally identical and operate independently of each other. All of the functions can be individually programmed, enabled or disabled, by writing to the control registers. Similarly, the results and status of each channel can be read from various read registers.

Figure 5A:
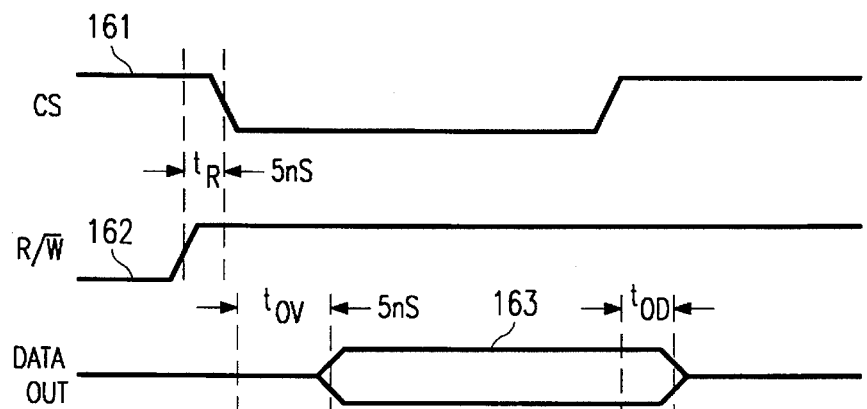
FIG. 5A is a timing diagram illustrating the timing for the microprocessor read cycle of the circuit of FIGS. 2 and 4.
Figure 5B:
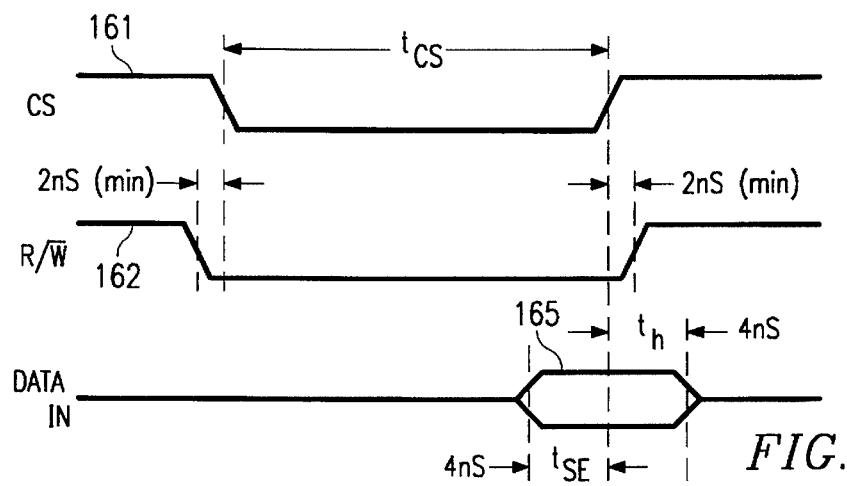
FIG. 5B is a timing diagram illustrating the timing for the microprocessor write cycle of the circuit of FIGS. 2 and 4.

Referring briefly to FIG. 5A, there is shown a circuit read cycle by illustrating that a chip select signal 161 and a read signal 162 received within a five nanosecond window t(R), enables a data outpulse 163. Similarly, as shown in FIG. 5B, receipt of a chip enabled signal 161 along with a write signal 162 enables a data inpulse 165 within a defined time period thereof.

As discussed above, the baud rate detection within the present system is based upon the start bit of the first odd value character. A preliminary baud rate value is produced in a counter and read into the microprocessor as a sixteen bit read only register at the interrupt following the end of the start bit. Thereafter, the serial receiver logic uses the detected preliminary baud rate to sample each data bit at approximately the mid point thereof. A baud rate interrupt signal is produced at the end of the first start bit for a particular port if the bit associated with that port in the interrupt control register 0 is enabled. The baud rate information is always available in the sixteen bit baud rate register regardless of whether the interrupt is enabled or not. Reading the baud rate register clears the pending baud rate interrupt signal. The baud rate counter overflow status in the error status register gives an indication to the processor when the start bit of the first character is too long due to some error condition such as a break character being received. The baud rate counter for a particular port is reset by writing a zero to the corresponding port in the channel activation register, waiting one microsecond for the multiplexing logic to clear the baud rate counter, and then writing a one to activate the port again.

Each of the four ports has a serial receiver and a four byte FIFO register 121–125 for serial input data from the received data input port 101. The serial data uses the detected preliminary data rate to sample every incoming character. Upon receiving a character, the serial receiver generates an interrupt for a port if the particular bit for that port is enabled in interrupt control register 1. The corresponding status is reflected in the data ready bit being set to one in the interrupt status register. The received data will be ready in the four byte FIFO register associated with it and the interrupt in status indication will remain active as long as data is pending in the FIFO register. Reading the FIFO register until it is empty will clear the interrupt and the related status. The FIFO register overflow status is indicated in the error status register for each of the four channels and is reset by writing to the FIFO control register.

As also described above in connection with FIGS. 2 and 4, the system of the present invention is also equipped with programmable trapping logic for the received data. Normally, every incoming character to the FIFO is compared to the two characters in the two trapping registers and any character matched will be reflected in an interrupt status. Reading interrupt status register 1 gives an indication whether or not the character being read matches a trapped character by observing the trapping interrupt status. The other trapping method is enabled by writing a one to enable trapping for the corresponding port in the interrupt control register 1. Every incoming character from the serial receiver is compared to the character written into the received trapping register. A FIFO data ready interrupt is generated upon a match and the character is stored in the FIFO. Those received characters that do not match will not enter the FIFO and cause any interrupt. The proper sequence for enabling this function is to write a particular character into the received trapping register first, then enable trapping in interrupt control register 1. Each port contains two received trapping registers A and B.

Figure 6:
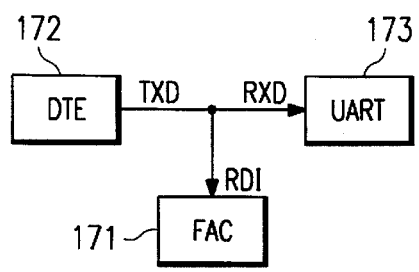
FIG. 6 is a block diagram illustrating the system of the present invention connected in a passive configuration between digital terminal equipment and a universal asynchronous receiver transmitter.
Figure 7:
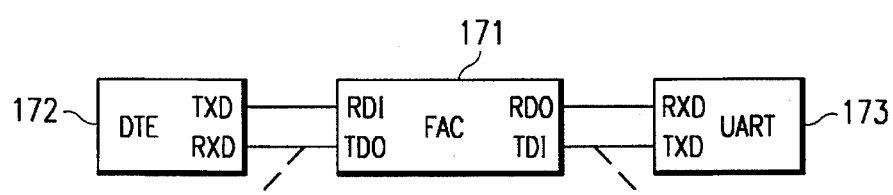
FIG. 7 is a block diagram illustrating the system of the present invention connected in an active configuration between digital terminal equipment and a universal asynchronous receiver transmitter.
Figure 7:
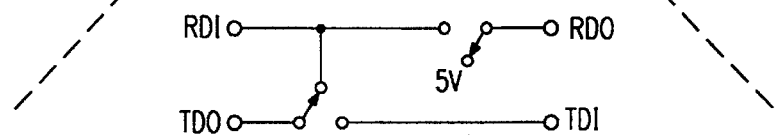

As illustrated in FIGS. 6 and 7 of the present invention, the system of the present invention can interface to serial communications controllers such as UARTs in two different configurations, passive and active. As shown in FIG. 6, the circuit of the present invention 171 is connected between a digital terminal equipment unit 172 and a UART 173. The digital terminal equipment 172 is transmitting data being received by the UART and the transmitted data is also being monitored by the circuit of the present invention 171. In this configuration, the circuit only serves as a passive baud rate detector and character monitoring component.

Referring to FIG. 7, the circuit of the present invention 171 is connected in an active mode directly between the digital terminal equipment 172 and the UART 173 to both send and receive data through the circuit 171. As shown in FIG. 7, the transmit data output (TDO) of the circuit can be either connected to transmit data input (TDI) of a transparent state or a TDI can be connected to receive data input (RDI) in loop back state. The transition from loop back state to transparent state occurs only during stop bit or idle. This function is useful in application when every received character from the digital terminal equipment (DTE) needs to be echoed back as soon as possible. The received data input (RDI) is always connected to the baud rate detection logic and serial receiver regardless of clamping or loop back on the RDO and TDO, respectively.

The initializing logic in the system of the present invention specifies that upon the activation of the reset input, the system will be initialized as follows:

(a) all four channels are disabled;
(b) all interrupts are disabled;

(c) received data is transparent with no clamping; and (d) transmit data is transparent with no loop back.

After initialization, the ports are enabled by writing a one to the channel activation register. The necessary interrupts are enable by writing to the interrupt control registers. The general control register 0 can be programmed to enable clamping and loop back functions on transmit and receive data.

Tables I and II, set forth below, contain the definition of the 16 read and 13 write registers contained within the microprocessor interface circuit 214 of FIG. 4 and specify the functions performed by each within the control arrangement of the system.

TABLE I

MICROPROCESSOR INTERFACE REGISTERS

| Read Registers | Write Registers |
|---|---|
| Interrupt status register 0 | Interrupt control register 0 |
| Interrupt status register 1 | Interrupt control register 1 |
| Baud rate register port 0 (LSB) | Receive trapping register A port 0 |
| Baud rate register port 0 (MSB) | Receive trapping register B port 0 |
| Baud rate register port 1 (LSB) | Receive trapping register A port 1 |
| Baud rate register port 1 (MSB) | Receive trapping register B port 1 |
| Baud rate register port 2 (LSB) | Receive trapping register A port 2 |
| Baud rate register port 2 (MSB) | Receive trapping register B port 2 |
| Baud rate register port 3 (LSB) | Receive trapping register A port 3 |
| Baud rate register port 4 (MSB) | Receive trapping register B port 3 |
| Error status register | Channel activation register |
| Status register | General control register |
| FIFO register port 0 | FIFO control register |
| FIFO register port 1 | |
| FIFO register port 2 | |
| FIFO register port 3 | |

TABLE II

Write Only Registers

| | |
|---|---|
| Interrupt Control Register 0 | 8 bit write register which controls baud rate detection interrupts for each port and use certain ports for transmitter function. |
| bit 7,6,5,4 | baud rate interrupt enable for port 3, 2, 1, and 0, respectively. 1: enabled 0: disabled |
| bit 3,2 | not used |
| bit 1,0 | transmitter empty interrupt enable for port 1 and 0, respectively. |
| Interrupt Control Register 1 | 8 bit write register which controls |

TABLE II-continued

Write Only Registers

| | |
|---|---|
| | interrupt for character presence in FIFO and recognition of trapped character. |
| bit 7,6,5,4 | character interrupt enable for port 3, 2, 1, and 0, respectively. 1: enabled 0: disabled |
| bit 3,2,1,0 | enable trapping logic for port 3, 2, 1, and 0, respectively. 1: enabled 0: disabled |

Trapped Character Registers

Receive trapping register A port 0
Receive trapping register B port 0
Receive trapping register A port 1
Receive trapping register B port 1
Receive trapping register A port 2
Receive trapping register B port 2
Receive trapping register A port 3
Receive trapping register B port 3
These are 8 bit write only register for receiving and storing two trapped characters to be recognized for each port. Each port has two receive trapping register A and B, and they are used by the processor to write a particular character to be trapped.

| | |
|---|---|
| Channel Activation Register | 8 bit write only register for enabling each one of the four ports. |
| bit 7,6,5,4 | port enable for port 3, 2, 1, and 0, respectively. 1: enabled 0: disabled |
| bit 3,2,1,0 | not used |
| General Control Register | 8 bit write register for controlling looping and clamping. |
| bit 7,6,5,4 | transmit data output (TDO) looping for port 3, 2, 1, and 0, respectively. 0: transparent (TDI connects to TDO) 1: looped (RDI is connected to TDO) |
| bit 3,2,1,0 | receive data output clamping (RDO) for port 3, 2, 1, and 0, respectively. 0: transparent 1: clamps to logic 1 |
| FIFO Control Register | 8 bit write only register for control of FIFO reset and overflow. |
| bit 7,6,5,4 | reset FIFO for port 3, 2, 1, and 0, respectively. 1: FIFO normal 0: FIFO empty |
| bit 3,2,1,0 | not used |

Read Only Registers

| | |
|---|---|
| Interrupt Status Register 0 | 8 bit read only register indicates whether or not an interrupt is currently present for each of the write registers set forth above. |
| bit 7,6,5,4 | baud rate interrupt status for port 3, 2, 1, and 0, respectively. 1: interrupt set |

TABLE II-continued

Write Only Registers

| | |
|---|---|
| bit 3,2 | 0: interrupt clear<br>not used |
| bit 1,0 | transmitter empty status for port 1 and 0, respectively.<br>1: empty<br>0: not empty |
| Interrupt Status Register 1 | 8 bit read only register indicates whether or not an interrupt is currently present for each of the write registers set forth above. |
| bit 7,6,5,4 | FIFO data ready status for port 3, 2, 1, and 0, respectively.<br>1: data in FIFO<br>0: FIFO empty |
| bit 3,2,1,0 | trapping interrupt status for port 3, 2, 1, and 0, respectively.<br>1: interrupt set<br>0: interrupt clear |

Baud Rate Registers

Baud rate register port 0
Baud rate register port 1
Baud rate register port 2
Baud rate register port 3
These are 16 bit read only registers which contain baud rate value for each of the four ports.

| | |
|---|---|
| Error Status Register | 8 bit read only register which indicates overflow status. |
| bit 7,6,5,4 | baud rate counter overrun for port 3, 2, 1, and 0, respectively.<br>1: overrun<br>0: clear |
| bit 3,2,1,0 | FIFO overflow status for port 3, 2, 1, and 0, respectively.<br>1: overflow<br>0: clear |
| Status Register | 8 bit read only register which indicates clamping or transparent mode of operation. |
| bit 7,6,5,4 | transmit data input (TDI) status for port 3, 2, 1, and 0, respectively.<br>1: TDI is connected to TDO<br>0: TDI is not connected to TDO |
| bit 3,2,1,0 | frame error status for incoming character from RDI for port 3, 2, 1, and 0, respectively.<br>1: frame error<br>0: no frame error |

FIFO Registers

FIFO register port 0
FIFO register port 1
FIFO register port 2
FIFO register port 3
These are 8 bit read only registers and each one is the address of a 4 byte FIFO where the incoming character from RDI can be read.

Figure 8:
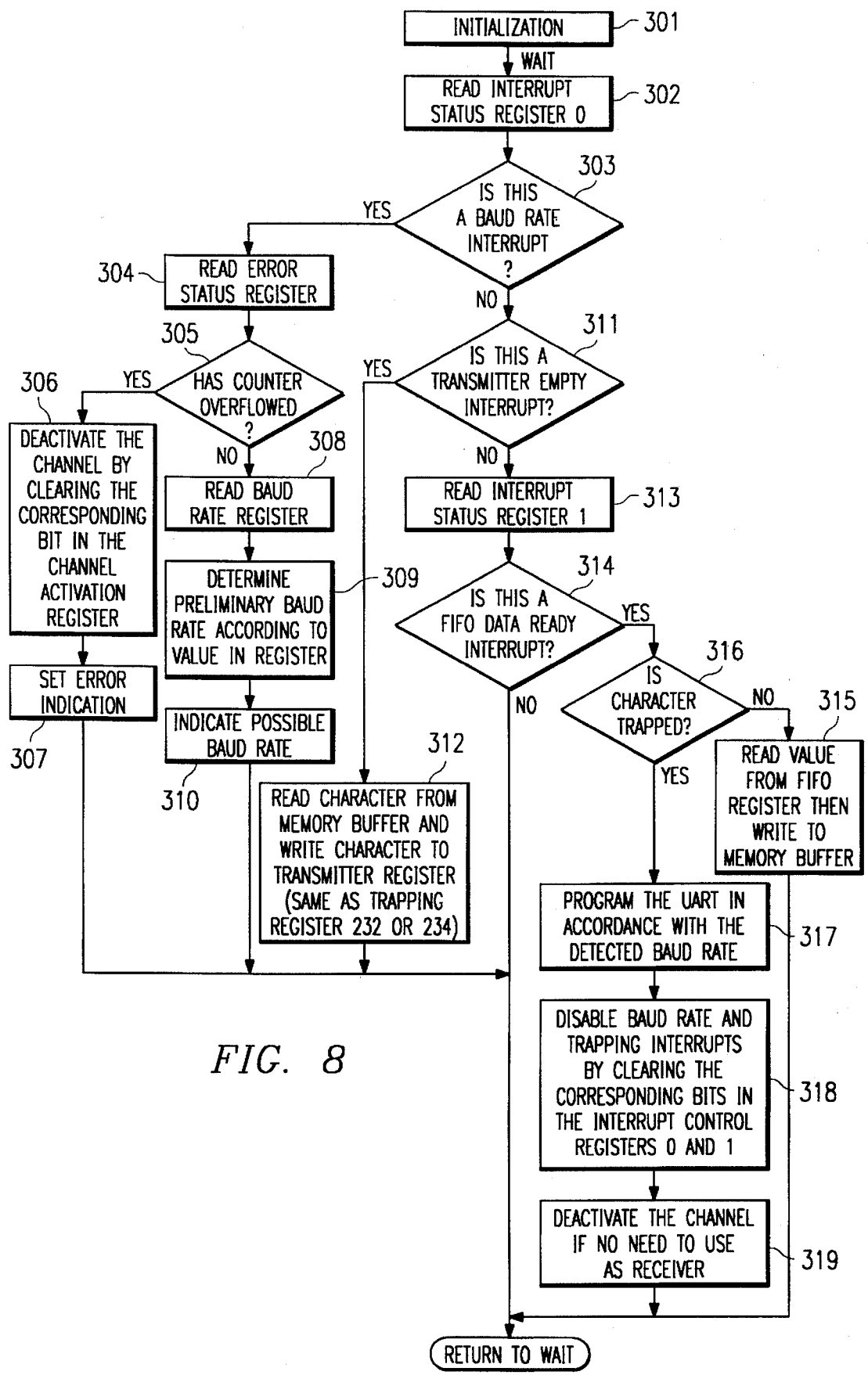
FIG. 8 is a flow chart illustrating the sequence of operation of the program within one aspect of the present invention.

Referring finally to FIG. 8, there is shown a flow chart illustrating the sequence of operation of the program controlling the circuit of the present invention. First, the circuit is initialized at 301 by the following sequence of operation performed for each of the plurality of several channels served by the circuit. The initialization procedure includes:

(a) activation of the FIFO circuit 121–125 associated with the channel by setting the corresponding bit in the FIFO control register for that channel;

(b) enabling the interrupts as appropriate by setting the bit in the interrupt control registers 0 and 1;

(c) programming the trapping character by writing the autobauding character to the trapping register A and B of the associated channel;

(d) setting the clamping bit if needed, i.e. for the circuits being configured in a passive mode no clamping is required but for being configured in the active mode clamping is required; and (e) enabling the associated channel by setting the corresponding bit to a 1 in the appropriate channel activation register.

Following initiation at 301, the circuit is ready for the receipt of an interrupt, such as either a baud rate determination interrupt, a transmitter empty interrupt, a FIFO data ready interrupt, or a trapping interrupt. As discussed above, a baud rate interrupt occurs in response to the receipt of an autobauding character after a start bit when no baud rate has yet been determined. A transmitter empty interrupt occurs when the circuit is being used as a transmitter with respect to those two transmitter/trapping logic circuits 232 and 234 capable of being used as a transmitter.

Upon receipt of an interrupt after initialization at 301, the system first reads the interrupt status register 0 at 302 and moves to 303 at which it asks whether or not a baud rate interrupt has occurred. If so, the system moves to the baud rate processing mode 304 at which it reads the error status register to determine whether or not an error has occurred. Next, it moves to 305 at which it asks whether or not the baud rate counter has overflowed. If it is determined at 305 that the counter has overflowed, for example, in response to an error condition in which a bad character has been received, the system moves to 306 at which it deactivates the affected channel by clearing the corresponding bit in the channel activation register. Next, the system moves to 307 at which it sets an error indication and returns to an idle state waiting for another interrupt. If, however, at 305 it is determined that the counter has not overflowed, the system moves to 308 at which it reads the baud rate register and then to 309 at which the baud rate is determined in accordance with the value of the baud rate register. At 310 the system indicates the possible baud rate determined from the calculation and returns to idle state waiting for the next interrupt.

If at 303, the system determines that the interrupt received was not a baud rate interrupt, it moves to 311 and asks whether or not the interrupt has a transmitter empty interrupt, i.e. whether the transmitter is ready to accept a character into it to transmit. If the interrupt was a transmitter empty interrupt, the system moves to 312 at which point the system reads the character from the memory buffer within the microprocessor and writes the character to the transmitter register for subsequent transmission. The transmitter register is one of those two transmitter/trapping logic registers 232 or 234. If the system determines at 311 that the interrupt was not a transmitter empty interrupt, it moves to 313 at which it reads the interrupt status register 1 and then to 314 at which it asks whether or not there is data within the FIFO of that channel which is ready for processing. If so, the system moves to 315 at which it reads from the FIFO register and writes the value into the memory buffer of the microprocessor for subsequent processing and returns to the idle state and await a subsequent interrupt. Next, it moves to 316 and asks whether or not the character received was a trapping character. If so, the system moves to the trapping process flow and at 317 programs the UART according to the detected baud rate previously calculated. The trapping status indicates that a trapped character has been recognized and hence, the possible baud rate has been confirmed as the actual baud rate enabling the recognition of a trapped character. The system then moves to 318 to disable the baud rate and trapping rate interrupt by clearing the corresponding bits in the interrupt control register 0 and 1. Thereafter, at 319, the system deactivates the affected channel that there is no need to use the receiver unit within the circuit. That is, if the system is connected to a UART, the UART will then perform the receiver function and a receiver channel would no longer be required. If, however, the present circuit were used as a receiver, in the case of where it is serving a device such as a printer or some other device which does not need to have an additional UART present, the channel is not activated but remains to serve as a receiver. After deactivation, the system returns to an idle state and is ready for subsequent utilization.

In summary, it can be seen how the system of the present invention enables the rapid and efficient determination of baud rate in a plurality of parallel data channels and then verifies that determination prior to controlling the flow of data into a UART device. In addition to providing two programmable autobauding characters for each channel, the asynchronous serial receiver checks the proper data format (serial synchronous protocol) for each input character. Any framing error will be reflected in the status register. This provides another flexible method for verifying the detected baud rate. Once the baud rate is detected, the receiver is operating at the detected data rate. This characteristic enables it to adapt to whatever baud rate (standard or non-standard baud rate) with which the input data is being received as long as it is consistent.

It is thus believed that the operation and construction of the present invention will be apparent from the foregoing description. While the method, apparatus and system shown and described has been characterized as being preferred, it will be readily apparent that various changes and modifications can be made therein without departing from the spirit and scope of the invention as defined in the following claims.

What is claimed is:

1. An autobauding circuit for determining a baud rate for a plurality of channels, each carrying an asynchronous data bit stream, comprising:

means for transparently sampling connected in parallel to said plurality of channels for sampling said data bit streams to output a bit stream sample for each of said plurality of channels; and a baud rate detection circuit connected to said means for transparently sampling for processing each output bit stream sample to determine a baud rate for each data bit stream for each of said plurality of channels, said baud rate detection circuit comprising:

means for measuring a pulse width of a start bit of each output bit stream sample to determine a preliminary baud rate;

a serial receiver for sampling each bit in each bit stream sample at a rate determined from the corresponding preliminary baud rates to identify a test word for each channel;

means for temporarily storing said test word for each channel; and means for comparing each test word to at least one stored word wherein a match between said test word and said stored word confirms said preliminary baud rate as the baud rate for that channel.

2. The autobauding circuit of claim 1 wherein said at least one stored word is comprised of a plurality of stored words.

3. The autobauding circuit of claim 2 further including means for providing an indication of said confirmed baud rate to a receiver for each of said channels so as to synchronize said receiver with said dam bit stream.

4. The autobauding circuit of claim 1 wherein said test word represents an odd character.

5. An autobauding circuit for determining a baud rate for a plurality of asynchronously operated channels each carrying an asynchronous data bit stream, comprising:

means connected in parallel to each of said channel for transparently sampling said data bit stream to output a bit stream sample wherein said means for transparently sampling comprises a logic circuit for transparent and sequential sampling of said data bit streams carried by each of said plurality, of asynchronously operated channels to output a sample bit stream for each channel; and a baud rate detection circuit connected to said means for transparently sampling for processing said output bit stream sample to determine a corresponding baud rate for each said data bit stream for each said channel.

6. The autobauding circuit of claim 5 further including means for providing an indication of said determined baud rate to a receiver for use in synchronizing said receiver with said data bit stream.

7. The autobauding circuit of claim 5 which further comprises means for clamping said dam bit streams to prevent passage of said data bit streams until said baud rate is confirmed.

8. A method of determining a baud rate for each of a plurality of data bit streams in a plurality of asynchronously operated channels comprising the steps of:

sampling each of said channels in a sequential and transparent manner to output a sample bit stream for each channel;

processing said sample bit stream for each channel to determine a preliminary baud rate for each of said channels; and confirming said preliminarily determined baud rate for each data bit stream for each of said channels.

9. The method of claim 8 wherein the step of processing said sample bit stream for each channel to determine a preliminary baud rate comprises the steps of:

detecting a start bit of the sample bit stream;

measuring a pulse width of said start bit; and calculating said preliminary baud rate based upon the width of said start bit.

10. The method of claim 8 wherein the step of confirming comprises the steps of sampling said data bit stream to read a test word at a rate determined from said preliminarily determined baud rate and of comparing said test word to a stored word whereby a match confirms said preliminarily determined baud rate.

11. The method of claim 10 further comprising the step of indicating to a receiver said confirmed baud rate of said data bit stream.

12. The method of claim 10 wherein test word represents an odd character.

13. The method of claim 10 further comprising the step of looping said data bit stream back to a transmitter so long as the baud rate is not confirmed.

14. The method of claim 13 further comprising the step of clamping said data bit stream so long as the baud rate is not confirmed.

15. A method of determining a baud rate for each of a plurality of data bit streams in a plurality of asynchronously operated channels comprising the steps of:

sampling each of said channels in a sequential and transparent manner to output a sample bit stream for each channel;

processing said sample bit stream for each channel to determine a preliminary baud rate for each of said channels;

sampling said bit stream to read a test word at a rate determined from said preliminarily determined baud rate; comparing said test word to a stored word whereby a match confirms said preliminarily determined baud rate; and looping said data bit stream back to a transmitter so long as the baud rate is not confirmed.

16. The method of claim 15 which further comprises the step of clamping each of said channels so long as the baud rate is not confirmed.

* * * * *

UNITED STATES PATENT AND TRADEMARK OFFICE
CERTIFICATE OF CORRECTION

Page 1 of 2

PATENT NO. : 5,627,858
DATED : May 6, 1997
INVENTOR(S) : Mak et al.

It is certified that error appears in the above-indentified patent and that said Letters Patent is hereby corrected as shown below:

Title Page, Item [57],
 Abstract, line 2     Replace "channels carrying of"
                              With --of channels carrying--

Column 6, line 46     Replace "enable"
                              With --enables--

Column 7, line 38     Replace "t(R)"
                              With --$t_R$--

Column 12, line 49     Replace "has"
                              With --was--

Column 14, line 8     Replace "dam"
                              With --data--

Column 14, line 14     Replace "channel"
                              With --channels--

Column 14, line 18     Replace "streams"
                              With --stream--

Column 14, line 19     Delete the comma after "plurality"

UNITED STATES PATENT AND TRADEMARK OFFICE
CERTIFICATE OF CORRECTION

PATENT NO. : 5,627,858
DATED : May 6, 1997
INVENTOR(S) : Mak et al.

It is certified that error appears in the above-indentified patent and that said Letters Patent is hereby corrected as shown below:

Column 14, line 30    Replace "dam"
                                      With --data--

Signed and Sealed this

Twenty-seventh Day of January, 1998

Attest:

BRUCE LEHMAN

*Attesting Officer*    *Commissioner of Patents and Trademarks*